(No Model.)

W. KOCH.
CASTER.

No. 300,782. Patented June 24, 1884.

Attest:
J. H. McLeem.
Jno. A. Senn.

Inventor.
William Koch
by James H. Layman
Atty.

UNITED STATES PATENT OFFICE.

WILLIAM KOCH, OF LAWRENCEBURG, INDIANA.

CASTER.

SPECIFICATION forming part of Letters Patent No. 300,782, dated June 24, 1884.

Application filed March 3, 1884. (No model.)

*To all whom it may concern:*

Be it known that I, WILLIAM KOCH, a citizen of the United States, residing at Lawrenceburg, in the county of Dearborn and State of Indiana, have invented certain new and useful Improvements in Furniture-Casters, of which the following is a specification, reference being had therein to the accompanying drawings.

This invention relates to those furniture casters or rollers which are provided with india-rubber tires; and my improvement consists in such a construction of said devices as will prevent the elastic tire shifting either laterally or circumferentially of the wheel or caster proper. This result is accomplished by providing the wheel, caster, or roller with a circumferential groove or grooves and a series of longitudinal slots that communicate with said groove and extend outwardly to the opposite sides of said wheel. The elastic tire is furnished with an inwardly-projecting tongue that enters the circumferential groove, and a series of internal ribs or flanges that engage with the above-described longitudinal slots, by which arrangement said tire is securely anchored in place, as hereinafter more fully explained, and set forth in the claim.

Figure 1:
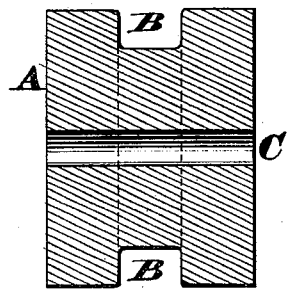
Figure 2:
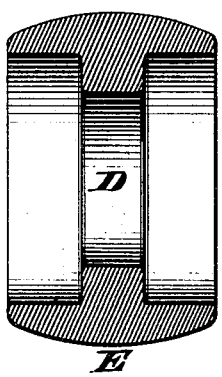
Figure 3:
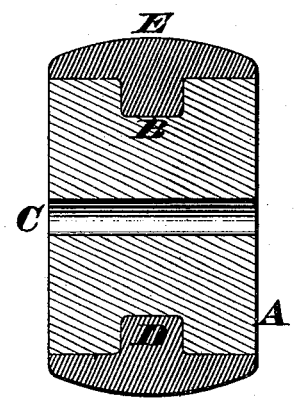
Figure 4:
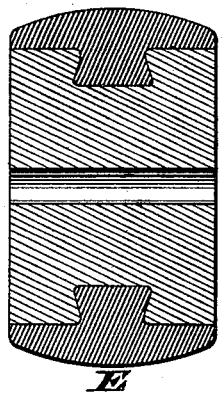
Figure 5:
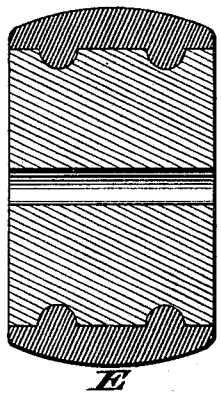
Figure 6:
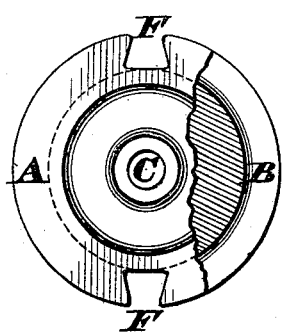
Figure 7:
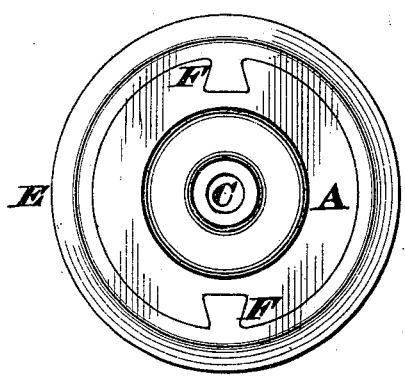

In the annexed drawings, Figures 1 and 2 are axial sections of the two component members of my caster detached from each other. Fig. 3 is a similar section of the complete caster. Figs. 4 and 5 show modified forms of the circumferential groove. Fig. 6 is a sectionized side elevation of the wheel or caster proper. Fig. 7 is a side elevation of the complete caster.

The roller, wheel, or caster proper, A, which may be of any suitable material and size, according to the use to which it is to be applied, is grooved circumferentially at B and bored at C, said bore C being designed to admit the axle, pintle, or other bearing. This groove B, which may be of any desired size and shape, is adapted to receive a rib, flange, or tongue, D, projecting from the inner periphery of the elastic or yielding tire, rim, or band E. Said rim is preferably composed of india-rubber, both on account of the economy of construction and facility of application; but the invention is not restricted to such material. Furthermore, reference to Fig. 2 shows that the rim or tire E is somewhat less in diameter than the caster A, and as a result of this arrangement the former hugs the latter very closely when said members A and E are united, as seen in Fig. 3. This union is effected by simply distending the tire, and then allowing it to contract around the caster, care being taken, however, to have the flange or rib D seat itself within the groove B. It is evident the tongue and groove now prevent lateral shifting of the tire, and thus obviate the necessity of cementing together these two component members A B and D E.

Figs. 1 and 2 show the groove and tongue as being rectangular in transverse section; but in Fig. 4 said groove is represented as being undercut at its sides, so as to allow the tongue to anchor therein.

In Fig. 5 the caster A is shown as provided with a pair of semicircular grooves to receive the correspondingly-shaped tongues of the rim or tire.

It is evident either of the above-described circumferential grooves will prevent the elastic tire E moving laterally or toward the side of wheel A; but some provision must be made for holding said tire so that it will not shift around the wheel. To guard against this last-mentioned contingency, the wheel A must have a series of longitudinal slots, F, made in its face, as seen in Fig. 6, said slots being arranged to communicate with the circumferential groove or grooves, and the tire must be provided with a corresponding number of inwardly-projecting ribs, adapted to enter said longitudinal slots, as represented in Fig. 7. Now, as the circumferential groove B and tongue D prevent the tire moving laterally of wheel A, and as the longitudinal slots F and the ribs entering the same retain said tire so that it will not shift around the periphery of the wheel, it is apparent the elastic member D E is securely anchored, and cannot be disengaged from its proper place except by a force sufficient to destroy said elastic member. Finally, the tire may be cast around the wheel, if desired.

I am aware it is not new to provide furniture-casters with circumferential grooves to prevent lateral motion of the rubber tires, as this construction is seen in several patents; but I know of no instance where longitudinal grooves or slots have been arranged to prevent the tire shifting around the periphery of the wheel, and therefore my claim is expressly limited to this feature.

I claim as my invention—

The combination, in a furniture-caster, of wheel A, having a series of longitudinal slots, F, communicating with the circumferential groove B, and the rubber tire E, provided with a set of internal ribs, that enter said longitudinal slots, and an inwardly-projecting tongue, D, that engages with said circumferential groove B, whereby the elastic tire is securely anchored in place, and is prevented shifting either laterally or peripherally of said wheel, as herein described.

In testimony whereof I affix my signature in presence of two witnesses.

WILLIAM KOCH.

Witnesses:
ANTON SCHNEIDER,
HENRY RUSSE.